US008625287B2

(12) United States Patent
Liu et al.

(10) Patent No.: US 8,625,287 B2
(45) Date of Patent: Jan. 7, 2014

(54) PORTABLE ELECTRONIC DEVICE WITH CHIP CARD EJECTING MECHANISM

(75) Inventors: Zhen-Lin Liu, Shenzhen (CN); Wen-Ze Liu, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 194 days.

(21) Appl. No.: 13/247,017

(22) Filed: Sep. 28, 2011

(65) Prior Publication Data

US 2012/0224330 A1 Sep. 6, 2012

(30) Foreign Application Priority Data

Mar. 4, 2011 (CN) .......................... 2011 1 0052344

(51) Int. Cl.
*H05K 7/16* (2006.01)
(52) U.S. Cl.
USPC ............................ 361/726; 361/727; 361/737

(58) Field of Classification Search
USPC ............ 361/726–730, 679.01, 600, 724–737, 361/752, 753, 807–810
See application file for complete search history.

(56) References Cited

U.S. PATENT DOCUMENTS

| 5,575,669 | A  | * | 11/1996 | Lin et al. ........................ 439/157 |
| 5,600,539 | A  | * | 2/1997  | Heys et al. ................ 361/679.32 |
| 7,184,274 | B2 | * | 2/2007  | Wu et al. ........................ 361/752 |
| 8,200,282 | B2 | * | 6/2012  | Liang et al. .................... 455/558 |
| 8,371,878 | B2 | * | 2/2013  | Tang .............................. 439/630 |
| 8,462,512 | B2 | * | 6/2013  | Zhang ........................... 361/737 |

* cited by examiner

*Primary Examiner* — Bernard Rojas
(74) *Attorney, Agent, or Firm* — Altis Law Group, Inc.

(57) ABSTRACT

A portable electronic device includes a housing defining an opening and a chip card ejecting mechanism. The chip card ejecting mechanism includes a pin slidably retained to the cover, a hinged carrier retained to the housing, and a spring. The hinge carrier includes a biasing plate resisting the cover, and the hinge includes a latching block and a resisting block. The latching block is latched with the hook to hold the cover in the opening. Depressing the pin against spring pressure exposes the chip card for easy removal.

20 Claims, 7 Drawing Sheets

PORTABLE ELECTRONIC DEVICE WITH CHIP CARD EJECTING MECHANISM

BACKGROUND

1. Technical Field

The present disclosure relates to portable electronic devices, and particularly to portable electronic devices with chip card ejecting mechanisms.

2. Description of Related Art

Commonly, portable electronic devices such as mobile phones include a chip card holder for holding the chip card therein.

Many chip card holders define a receiving groove for receiving the chip card. The chip card is partly received in the receiving groove to be electronically connected to a circuit of the device employing the chip card, and partly exposed so that it may be gripped for removal. However, the exposed part of the chip card is usually small and therefore difficult for a user to grasp.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the exemplary chip card ejecting mechanism and portable electronic device using the chip card ejecting mechanisms. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
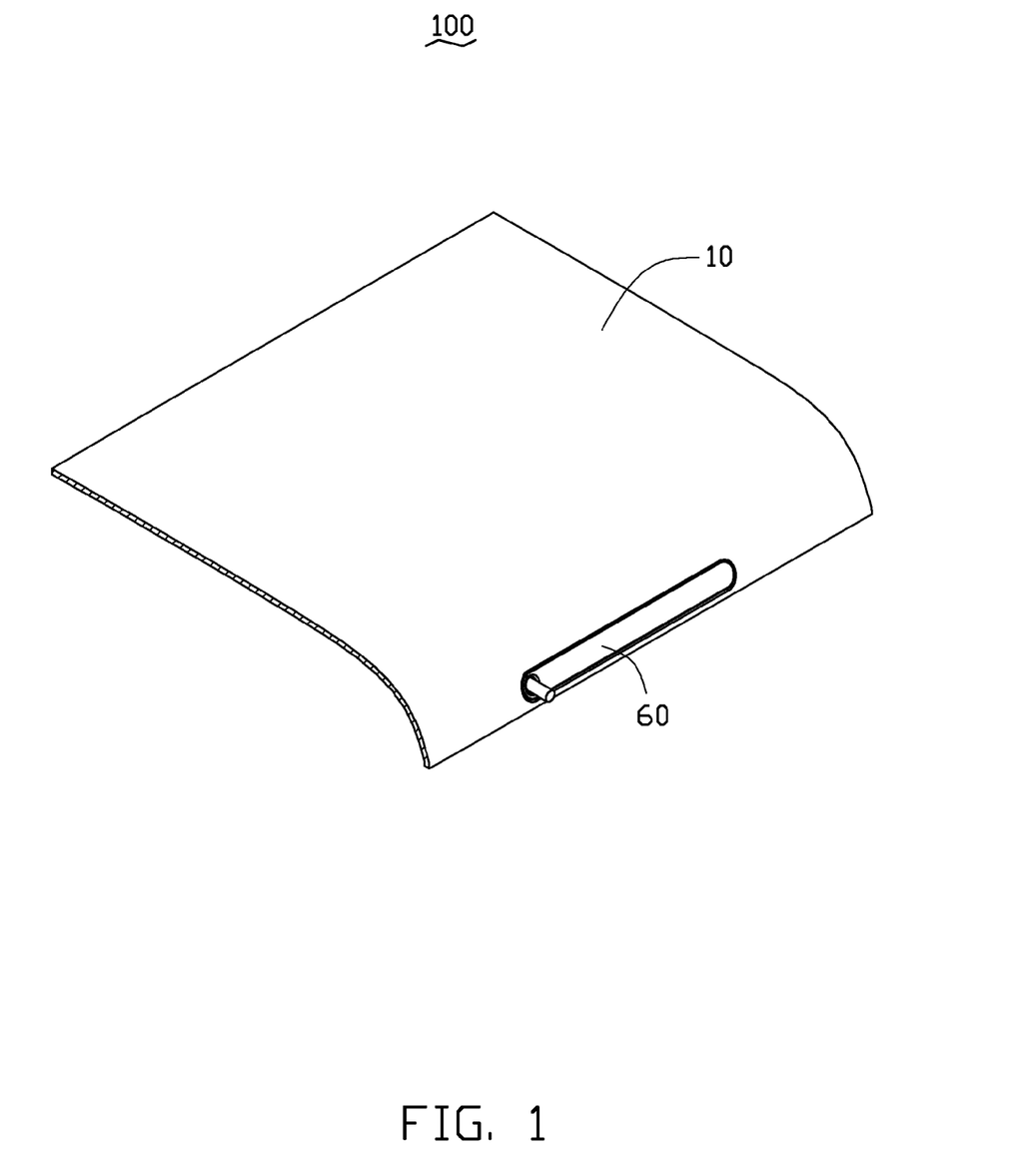
FIG. 1 is a view of one embodiment of a chip card ejecting mechanism as used in a portable electronic device, the portion of the portable electronic device including a housing and a chip card ejecting mechanism.
Figure 2:
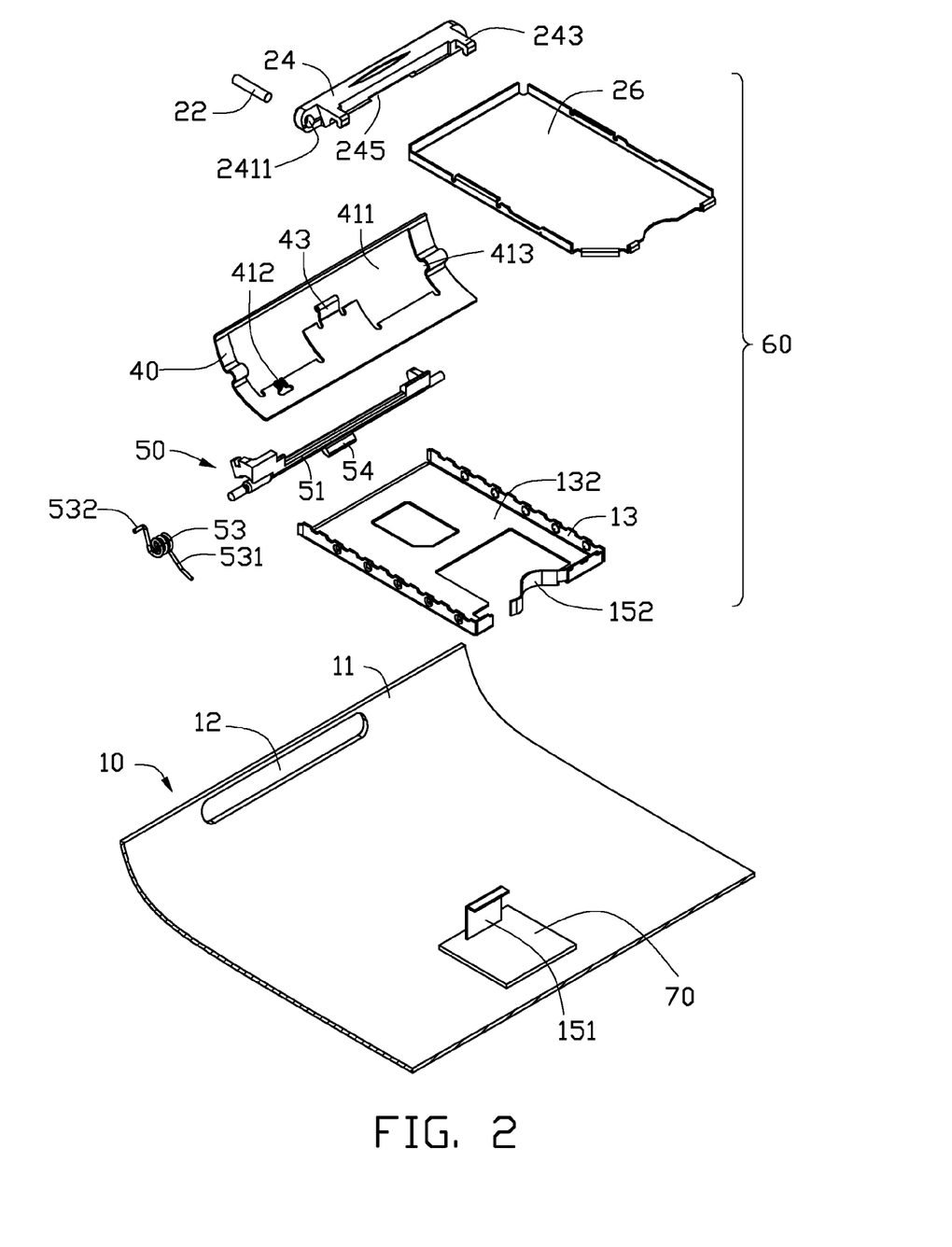
FIG. 2 is an exploded view of the portable electronic device of FIG. 1, but taken from another aspect.

Referring to FIGS. 1 and 2, an embodiment of a chip card ejecting mechanism 60 which can be used on a portable electronic device 100, such as a cellular phone or any electronic device where a chip card is required. The portable electronic device 100 includes a housing 10 and a chip card ejecting mechanism 60 mounted to the housing 10. The chip card ejecting mechanism 60 is configured to mount a chip card (not shown) in the housing 10. The housing 10 includes a sidewall 11, and defines an opening 12 through the sidewall 11. The chip card ejecting mechanism 60 ejects the chip card out of the housing 10 through the opening 12.

Figure 4:
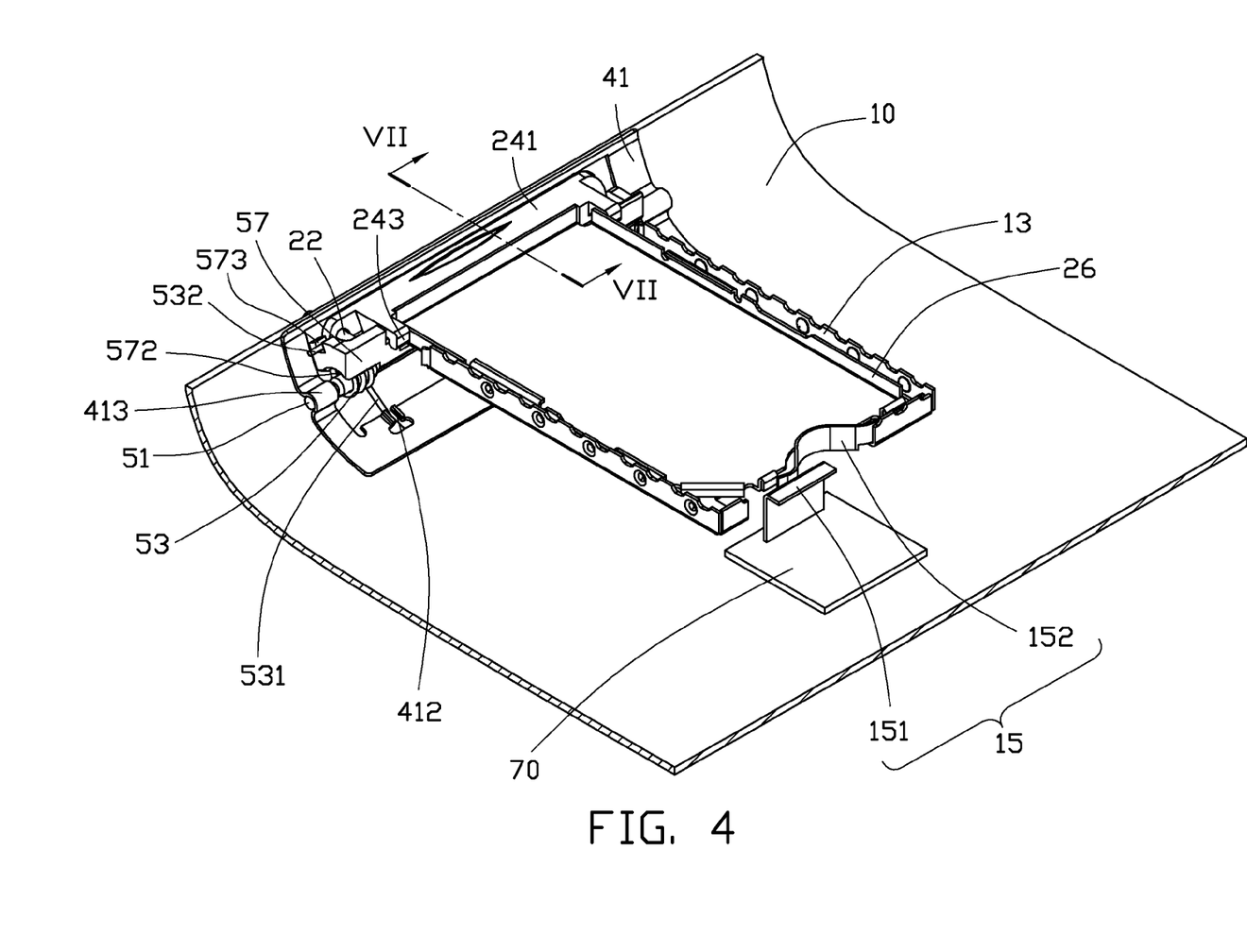
FIG. 4 is similar to FIG. 1, but showing the portable electronic device from another aspect.

Referring to FIGS. 2 and 4, the chip card ejecting mechanism 60 includes a support 13, a hinge carrier 40, a hinge 50, a spring 53, a tray 26 and a cover 24. The support 13 is retained in the housing 10 and aligned with the opening 12. The hinge carrier 40 is retained in the housing 10 between the sidewall 11 and the support 13. The hinge 50 is rotatably retained on the hinge carrier 40. The spring 53 is retained between the hinge 50 and the hinge carrier 40 to provide an elastic force which drives the hinge 50 to rotate relative to the hinge carrier 40, thereby making the hinge 50 latch with the cover 24, as detailed below. The tray 26 is slidably mounted to the support 13. The cover 24 is retained (e.g., hot-melted) to the tray 26.

Figure 7:
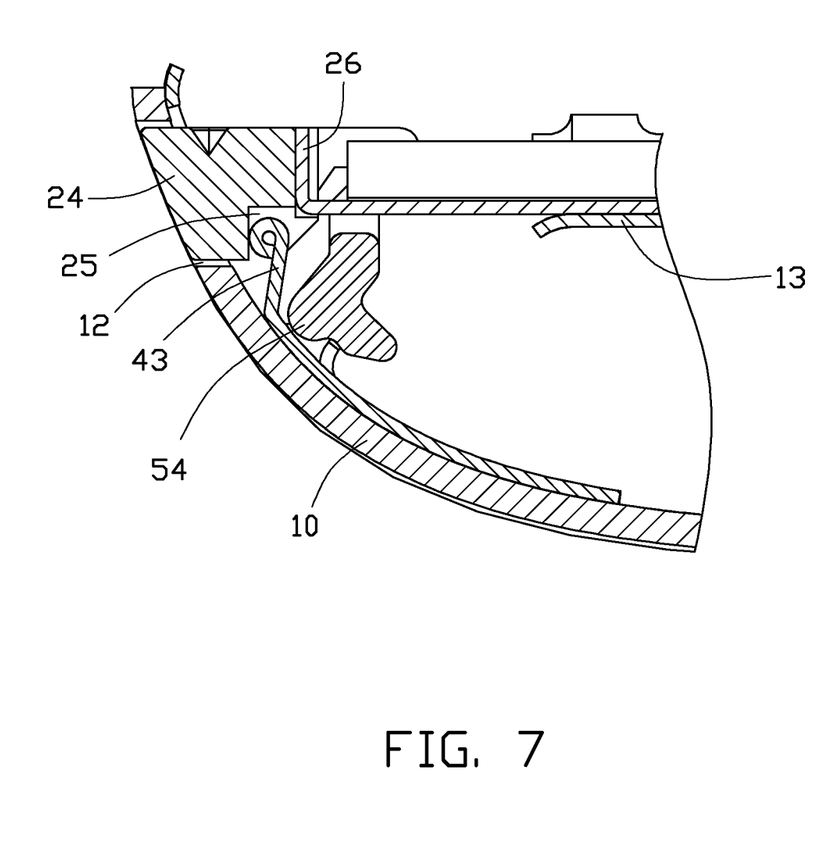
FIG. 7 is a cross-sectional view of the portable electronic device of FIG. 4 along the line VII-VII.

Referring to FIGS. 2, 4 and 7, the support 13 defines a compartment 132 for accommodating the tray 26. In this exemplary embodiment, the hinge carrier 40 is a curved plate, shaped to fit flush to the housing 10 so that the hinge carrier 40 as fitted is cosmetically pleasing. The hinge carrier 40 defines a passage 411 aligned with the opening 12 and the compartment 132. The passage 411 allows the cover 24 and the tray 26 to pass through the hinge carrier 40. The hinge carrier 40 further defines two shaft holes 413, one at each side of the passage 411. The shaft holes 413 are used to rotatably retain the hinge 50. The hinge carrier 40 further includes a biasing plate 43 protruding into the passage 411. The biasing plate 43 resists the cover 24 when the cover 24 is accommodated in and covers the opening 12. The hinge carrier 40 may further defines a securing groove 412 for holding one end of the spring 53.

Figure 3:
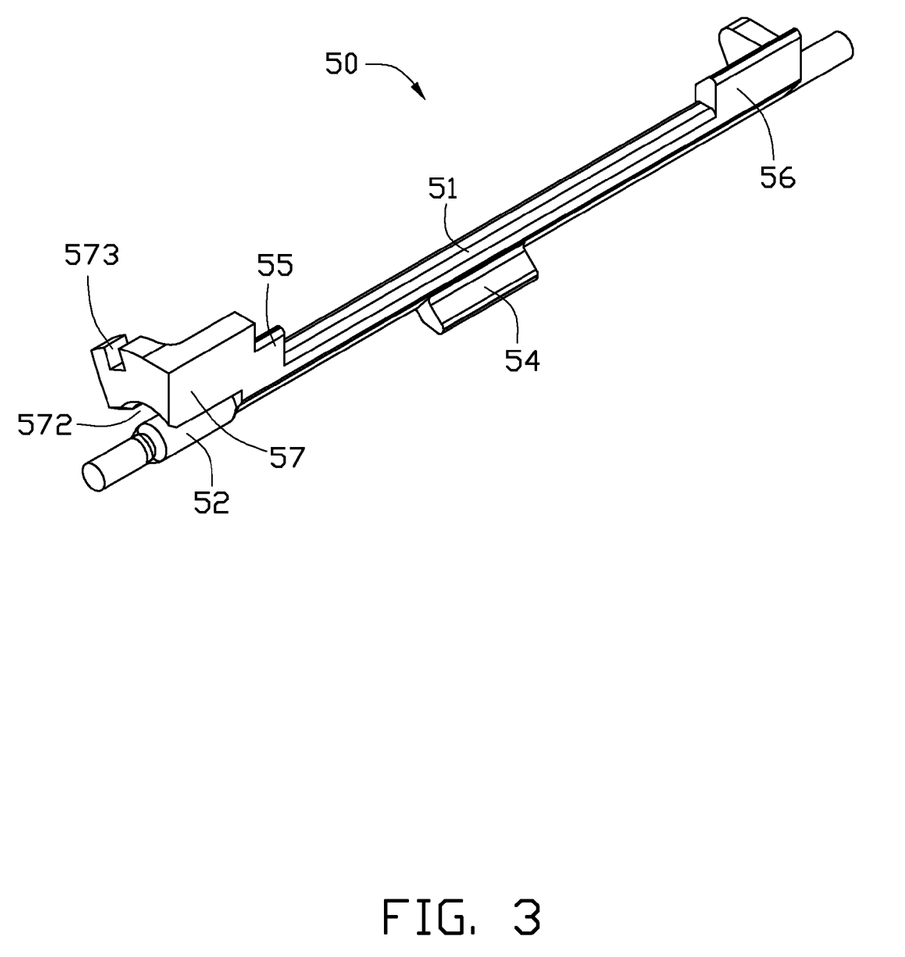
FIG. 3 is an enlarged view of the hinge of FIG. 2.

Referring to FIGS. 3-4 and 7, the hinge 50 includes a shaft 51, a resisting block 54, two latching blocks 55, 56, and an elongating block 57. The two ends of the shaft 51 are respectively and rotatably accommodated in the shaft holes 413 so the hinge 50 is retained to the hinge carrier 40. The resisting block 54 protrudes from the center portion of the shaft 51, and resists the biasing plate 43 when the hinge 50 is retained to the hinge carrier 40. When the hinge 50 rotates, the resisting block 54 biases the biasing plate 43 toward the opening 12. Each of the latching blocks 55, 56 is near an end of the shaft 51. The latching blocks 55, 56 latch with the cover 24 to hold the cover 24 in the opening 12. The elongating block 57 protrudes from the latching block 55, and is spaced from the shaft 51 to define a curving gap 572 between the elongating block 57 and the shaft 51, the gap 572 is to accommodate a torsion spring. The elongating block 57 defines a retaining groove 573 opposite to the gap 572 for retaining the other end of the spring 53.

Referring to FIGS. 3-4, in this exemplary embodiment, the spring 53 is a coil torsion spring, and includes a first end 531 and a second end 532. When the spring 53 is mounted to the shaft 51 and located in the gap 572, the first end 531 is latched in the securing groove 412, and the second end 532 is latched in the retaining groove 573. The spring 53 provides a constant force tending to rotate the hinge 50 so the latching blocks 55, 56 are seeking the opening 12.

Figure 5:
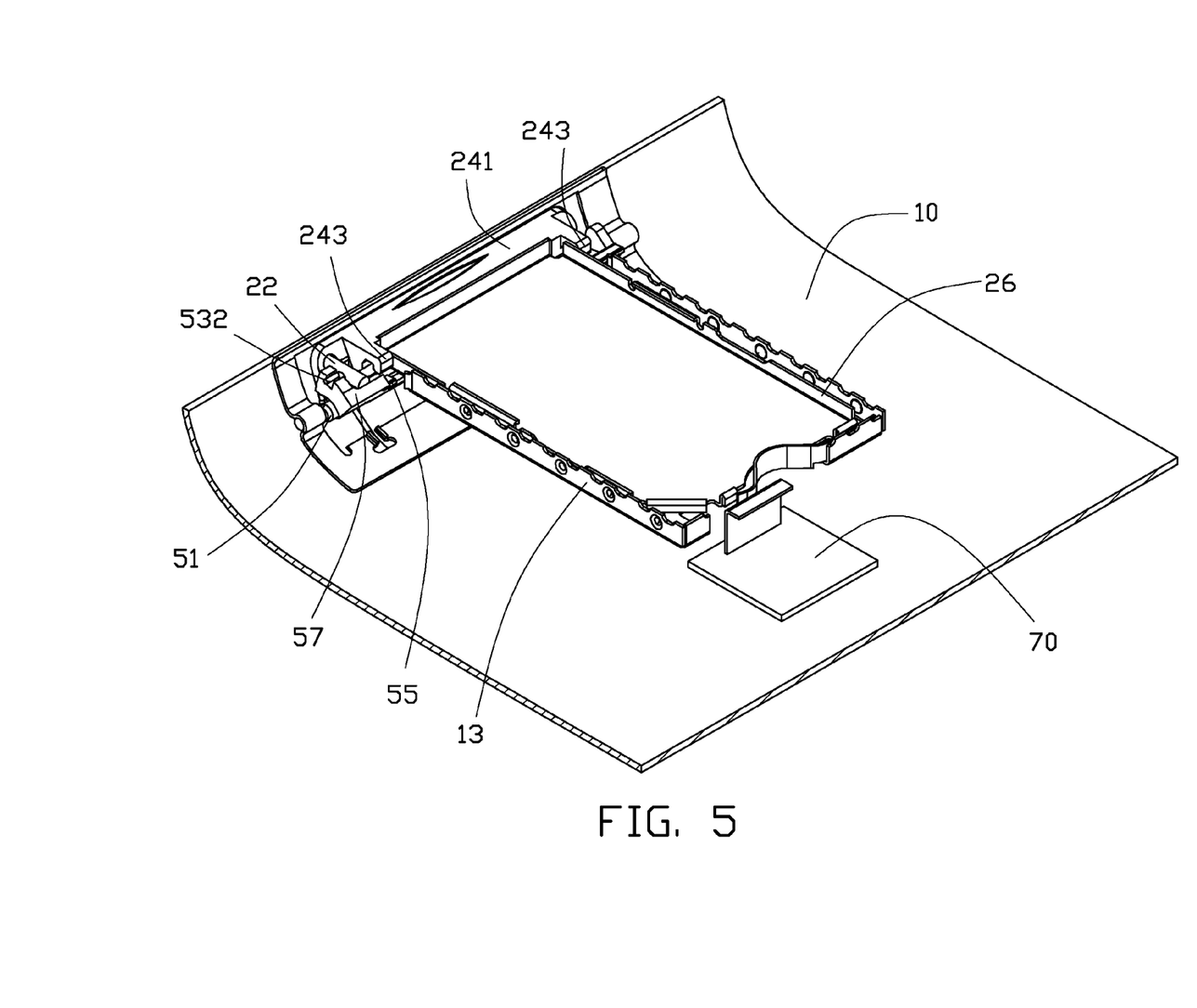
FIG. 5 is an isometric view of the portable electronic device wherein the cover is unfastened from the hinge.

Referring to FIGS. 2 and 4, the center portion of the cover 24 defines a notch 245, in which the biasing plate 43 is located when the cover 24 is accommodated in, and covers, the opening 12. The cover 24 further includes two hooks 243, one at each side of the notch 245. Each hook 243 latches one of the latching blocks 55, 56 to hold the cover 24 in the opening 12. The cover 24 further defines an orifice 2411 corresponding the elongating block 57. A tool, i.e., a pin 22, is used to operate the chip card ejecting mechanism 60. The pin 22 can be inserted into the orifice 2411 to push the elongating block 57 of the hinge 50. Referring to FIG. 5, when the pin 22 is pushed, the shaft 51 is rotated until the latching blocks 55, 56 are released from the hooks 243. The tray 26 is retained to the button 24 between the hooks 243.

Figure 6:
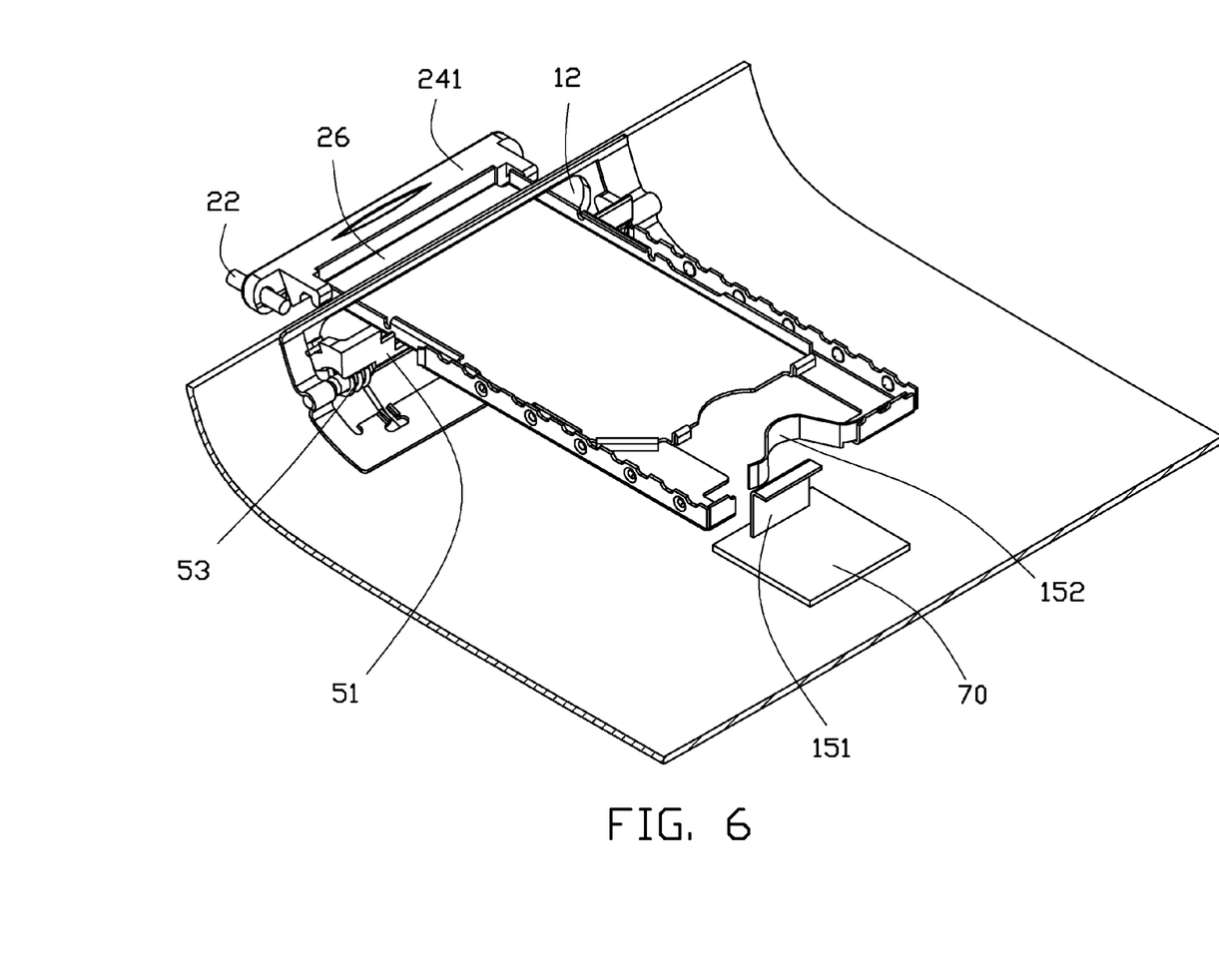
FIG. 6 is an isometric view of the portable electronic device wherein the cover is removed from the housing.

Referring to FIGS. 4 and 6, the portable electronic device 100 may further include a detecting assembly 15 for determining the open or closed state of the tray 26. The detecting assembly 15 includes an elastic plate 152 and a contact 151 electrically connected to the circuit board 70 of the portable electronic device 100. The elastic plate 152 is located at an end of the support 13 opposite the opening 12. When the tray 26 is accommodated in the compartment 132, the tray 26 pushes the elastic plate 152 to close the contact 151 and render it conductive, at this time, the circuit board 70 generates a first signal to signify that the tray 26 is accommodated in the compartment 132. When the tray 26 moves out of the compartment 132, the elastic plate 152 is released and the contact 151 no longer conducts, and the circuit board 70 then generates a second signal to indicate that the tray 26 is out.

Referring to FIGS. 4 and 7, in assembly of the device, the spring 53 is mounted to the shaft 51 with the second end 532 retained in the retaining groove 573. The two ends of the shaft 51 are accommodated in the shaft holes 413 with the resisting block 54 resisting the biasing plate 43, and the first end 531 latched in the securing groove 412. The hinge carrier 40 is retained to the housing 10, and the passage 411 is aligned with the opening 12. The tray 26 may be retained (e.g., hot-melted) to the cover 24. The tray 26 passes through the opening 12 and the passage 411 until the tray 26 is fully accommodated in the compartment 132. At this stage, the hooks 243 latch with the latching blocks 55, 56 to hold the cover 24 in the opening 12, and the biasing plate 43 is located in the notch 245. In this way, the chip card ejecting mechanism 60 is assembled to the housing 10.

Referring to FIGS. 5-7, in everyday use, and against spring pressure, the pin 22 is inserted into the orifice 2411 (or pushed further into the orifice 2411) to drive the elongating block 57 and the shaft 51 to rotate until the hooks 243 are released from the latching blocks 55, 56. The spring 53 is thus further compressed. As the shaft 51 is rotated, the resisting block 54 biases the biasing plate 43 toward the opening 12, which drives the cover 24 to partially move out of the opening 12 (as shown in FIG. 6), thereby facilitating the exposure of the cover 24 and the tray 26 out of the opening 12. After that, the release of the pin 22 allows the spring 53 to reverse and clear the elongating block 57 and the shaft 51. Then, the cover 24 and the tray 26 may very easily be pulled out of the opening 12 by human fingers. The chip card is put on the tray 26. The cover 24 is pushed in, the tray 26 passes through the opening 12 and the passage 411 until the tray 26 is fully accommodated in the compartment 132, the hooks 243 latch with the latching blocks 55, 56 and the biasing plate 43 is once again located in the notch 245.

Although numerous characteristics and advantages of the exemplary disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A portable electronic device comprising:
    a housing defining an opening; and
    a chip card ejecting mechanism comprising:
        a cover slidably retained in the opening, the cover including a hook;
        a tray retained to the cover, the tray for accommodating a chip card;
        a hinge carrier retained to the housing, the hinge carrier including a biasing plate resisting the cover;
        a hinge including a shaft, and a latching block and a resisting block protruding from the shaft, the shaft rotatably retained to the hinge carrier so the hinge is capable of rotating relative to the hinge carrier, the resisting block resisting the biasing plate, the latching block releasably latched with the hook to hold the cover in the opening;
        a spring retained between the hinge and the hinge carrier, the spring providing an elastic force to make the latching block latch with the hook;
        wherein the hinge is driven to rotate relative to the hinge carrier with the spring being compressed until the latching block is unfastened from the hook and the resisting block biases the biasing plate to push the cover out of the opening.

2. The portable electronic device of claim 1, further comprises a pin slidably retained to the cover; when the pin is pushed, the pin drives the hinge to rotate relative to the hinge carrier.

3. The portable electronic device of claim 1, wherein the hinge carrier comprises two shaft holes, two ends of the shaft are respectively and rotatably retained in the shaft holes.

4. The portable electronic device of claim 3, wherein the spring comprises a first end and a second end; the first end is retained to the hinge carrier, the second end is retained to the hinge.

5. The portable electronic device of claim 1, wherein the chip card ejecting mechanism further comprises a support retained to the housing and aligned with the opening; the support defines a compartment, in which the tray is slidably accommodated in.

6. The portable electronic device of claim 5, wherein the housing includes a sidewall, through which the opening is defined; the hinge carrier is retained to the housing between the sidewall and the support.

7. The portable electronic device of claim 6, wherein the hinge carrier defines a passage aligned with the opening and the compartment; the passage is used to make the cover and the tray pass through the hinge carrier.

8. The portable electronic device of claim 5, further comprises a detecting assembly for detecting whether the tray is inserted in the support or pulled out of the support.

9. The portable electronic device of claim 8, further comprises a circuit board; the detecting assembly includes an elastic plate and a contact electrically connected to the circuit board.

10. The portable electronic device of claim 9, wherein the elastic plate is located at an end of the support opposite to the opening.

11. The portable electronic device of claim 9, wherein when the tray is accommodated in the compartment, the tray pushes the elastic plate to connect the contact, the circuit board generates a first signal represent the tray is accommodated in the compartment.

12. The portable electronic device of claim 9, wherein when the tray is pulled out of the compartment, the elastic plate is released and spaced from the contact, and the circuit board generates a second signal to represent the tray is pulled out of the compartment.

13. The portable electronic device of claim 1, wherein a center portion of the cover defines a notch, in which the biasing plate is located when the cover is accommodated in the opening.

14. The portable electronic device of claim 1, wherein the cover further defines an orifice, the pin is slidably received in the orifice.

15. A portable electronic device comprising:
a housing defining an opening; and
a chip card ejecting mechanism comprising:
- a cover slidably retained in the opening, the cover including a hook;
- a tray retained to the cover, the tray for accommodating a chip card;
- a pin slidably retained to the cover;
- a hinge carrier retained to the housing, the hinge carrier including a biasing plate resisting the cover;
- a hinge rotatably retained to the hinge carrier, the hinge including a latching block and a resisting block, the latching block releasably latched with the hook to hold the cover in the opening;
- a spring retained between the hinge and the hinge carrier, the spring providing an elastic force to make the latching block latch with the hook;
- wherein when the pin is pushed, the pin drives the hinge to rotate relative to the hinge carrier to compress the spring so the latching block is released from the hook, the resisting block biases the biasing plate toward the opening so the cover is pushed out of the opening.

16. The portable electronic device of claim 15, wherein the spring comprises a first end and a second end; the first end is retained to the hinge carrier, the second end is retained to the hinge.

17. The portable electronic device of claim 15, wherein the chip card ejecting mechanism further comprises a support retained to the housing and aligned with the opening; the support defines a compartment, in which the tray is slidably accommodated in.

18. The portable electronic device of claim 17, wherein the housing includes a sidewall, through which the opening is defined; the hinge carrier is retained to the housing between the sidewall and the support.

19. The portable electronic device of claim 17, wherein the hinge carrier defines a passage aligned with the opening and the compartment; the passage is used to make the cover and the tray pass through the hinge carrier.

20. The portable electronic device of claim 17, further comprises a detecting assembly for detecting whether the tray is inserted in the support or pulled out of the support.

* * * * *